(12) United States Patent
Nishimura et al.

(10) Patent No.: US 10,960,831 B2
(45) Date of Patent: Mar. 30, 2021

(54) WIRE HARNESS FIXING STRUCTURE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Housei Mizuno, Mie (JP); Satoshi Ujita, Mie (JP); Motohiro Yokoi, Mie (JP); Shigeki Ikeda, Mie (JP); Daisuke Ebata, Mie (JP); Haruka Nakano, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/641,453

(22) PCT Filed: Jun. 5, 2018

(86) PCT No.: PCT/JP2018/021509
§ 371 (c)(1),
(2) Date: Feb. 24, 2020

(87) PCT Pub. No.: WO2019/044097
PCT Pub. Date: Mar. 7, 2019

(65) Prior Publication Data
US 2020/0198557 A1     Jun. 25, 2020

(30) Foreign Application Priority Data
Sep. 4, 2017 (JP) .............................. JP2017-169186

(51) Int. Cl.
*B60R 16/02*        (2006.01)

(52) U.S. Cl.
CPC ................. *B60R 16/0215* (2013.01)

(58) Field of Classification Search
CPC ............ B60R 16/0215; B60R 16/0207; H01B 13/012; H01B 7/40; H01B 7/0045; H02G 3/30; H02G 3/32
See application file for complete search history.

(56) References Cited

U.S. PATENT DOCUMENTS

2015/0321625 A1* 11/2015 Sato .......................... H02G 3/30
                                                                174/72 A
2016/0046245 A1* 2/2016 Kajiwara ................ F16L 3/137
                                                                 248/71

(Continued)

FOREIGN PATENT DOCUMENTS

GB      2 203 598 A     10/1988
JP       63-166635 A     7/1988

(Continued)

OTHER PUBLICATIONS

International Search Report issued in PCT/JP2018/021509, dated Aug. 7, 2018.

(Continued)

*Primary Examiner* — Timothy J Thompson
*Assistant Examiner* — Amol H Patel
(74) *Attorney, Agent, or Firm* — Greenblum & Bernstein, P.L.C.

(57) ABSTRACT

A wire harness fixing structure includes; a silencer disposed between a floor mat and a body in a vehicle; a wire harness disposed along a main surface of the silencer; and fixing member fixing the wire harness to the silencer while being passed through a through hole formed to pass through the silencer in a thickness direction. An inner peripheral surface of the through hole in the silencer is closely attached to the fixing member.

8 Claims, 9 Drawing Sheets

(56) References Cited

U.S. PATENT DOCUMENTS

2016/0121821 A1* 5/2016 Suzuki ............... B60R 16/0215
                                                 296/97.23
2017/0327060 A1* 11/2017 Nakajima ........ H01B 13/01254

FOREIGN PATENT DOCUMENTS

| JP | 63-176757 A | | 7/1988 |
|----|-------------|---|--------|
| JP | 64-67443 A | | 3/1989 |
| JP | 2001-251742 A | | 9/2001 |
| JP | 2006-347273 A | | 12/2006 |
| JP | 2006347273 A | * | 12/2006 |
| JP | 2007-307920 A | | 11/2007 |
| JP | 2007307920 A | * | 11/2007 |

OTHER PUBLICATIONS

International Preliminary Report on Patentability in PCT/JP2018/021509 and English language translation thereof, dated Mar. 19, 2020.

Japan Official Action received in JP Application No. 2017-169186, dated Aug. 11, 2020 and English language translation thereof.

Indian Official Action issued in Indian Applicant No. 202017007081, dated Dec. 16, 2020.

* cited by examiner

WIRE HARNESS FIXING STRUCTURE

TECHNICAL FIELD

The present invention relates to a technique of fixing a wire harness.

BACKGROUND ART

Patent Document 1 discloses a technique of embedding and fixing a wire harness to a urethane member (also referred to as a silencer, for example) embedded between a body and a floor mat in a bottom part of an automobile for purpose of acoustic insulation and flattening a concavo-convex shape, for example.

PRIOR ART DOCUMENTS

Patent Documents

Patent Document 1: Japanese Patent Application Laid-Open No. 63-166615

SUMMARY

Problem to be Solved by the Invention

However, in the technique described in Patent Document 1, the wire harness needs to be insert-molded as an insert component.

Thus, an object of the present invention is to provide a technique capable of easily fixing a wire harness, which is formed as a separated body, to a silencer.

Means to Solve the Problem

In order to solve the above problem, a wire harness fixing structure according to a first aspect includes; a silencer disposed between a floor mat and a body in a vehicle; a wire harness disposed along a main surface of the silencer; and fixing member fixing the wire harness to the silencer while being passed through a through hole formed to pass through the silencer in a thickness direction, wherein an inner peripheral surface of the through hole in the silencer is closely attached to the fixing member.

The wire harness fixing structure according to a second aspect is the wire harness fixing structure according to the first aspect, wherein the fixing member includes a tag pin-like member having a first locking part and a second locking part each locked to an outer side of one of both main surfaces of the silencer and a connection part, at least part of which passes through the silencer, while connecting the first locking part and the second locking part.

The wire harness fixing structure according to a third aspect is the wire harness fixing structure according to the second aspect, wherein both one end portion on a side of the first locking part and another end portion on a side of the second locking part in the connection part in the tag pin-like member pass through the silencer in positions away from each other, and the wire harness is sandwiched between the silencer and a middle portion in the connection part which is exposed.

The wire harness fixing structure according to a fourth aspect is the wire harness fixing structure according to the second aspect, wherein the first locking part is located on an outer side of a main surface, on which the wire harness is disposed, of the silencer, and the second locking part is located on an outer side of a main surface located on an opposite side of the main surface, on which the wire harness is disposed, of the silencer, and a sheet material to which an electrical wire is fixed in the wire harness is located between the first locking part and the silencer.

The wire harness fixing structure according to a fifth aspect is the wire harness fixing structure according to any one of the second to fourth aspects, wherein in the main surface located on the opposite side of the main surface, on which the wire harness is disposed, of the silencer, a portion to which at least one of the first locking part and the second locking part in the tag pin-like member is locked is concaved in a thickness direction with respect to a surrounding area of the portion.

The wire harness fixing structure according to a sixth aspect is the wire harness fixing structure according to any one of the first to fifth aspects, wherein the fixing member includes a clip with a supporting column part and a locking piece formed on a tip of the supporting column part so as to be able to be inserted into and locked to a hole, and the locking piece of the clip is locked to a position of a middle portion in the through hole.

The wire harness fixing structure according to a seventh aspect is the wire harness fixing structure according to any one of the first to sixth aspects, wherein the fixing member includes a first member which is made of a material having higher rigidity than the silencer, sandwiches a peripheral edge part of the through hole, and is fixed to the peripheral edge part and a second member which is inserted into and locked to a bottomed hole formed in the first member.

The wire harness fixing structure according to an eighth aspect is the wire harness fixing structure according to any one of the first to seventh aspects, wherein the wire harness includes an electrical wire and a sheet material which the electrical wire is fixed to and which is sandwiched between the fixing member and the silencer.

The wire harness fixing structure according to a ninth aspect is the wire harness fixing structure according to any one of the first to eighth aspects, wherein the wire harness includes a plurality of electrical wires bundled into a circular shape in cross section.

Effects of the Invention

According to the first to ninth aspects, the wire harness formed as a separated body can be easily fixed to the silencer by the fixing member. At this time, the inner peripheral surface of the through hole in the silencer is closely attached to the fixing member, thus reduction in acoustic insulation due to the generation of the through hole can be suppressed.

Particularly, according to the second aspect, even when the through hole is not previously provided in the silencer, the tag pin-like member can be easily driven into the silencer using a tag gun, for example. The through hole formed when the tag pin-like member is driven is not accompanied with the removal of the silencer, thus the inner peripheral surface of the through hole is closely attached to the connection part easily, and the reduction in the acoustic insulation due to the generation of the through hole can be suppressed.

Particularly, according to the third aspect, the fixation state of the wire harness is stabilized, and the wire harness is hardly influenced by a vibration, for example.

Particularly, according to the fourth aspect, the wire harness can be fixed to the silencer by the relatively short tag pin-like member.

Particularly, according to the fifth aspect, it is possible to suppress a protrusion of the tag pin-like member to an outer side of the main surface located on the opposite side of the main surface, on which the wire harness is disposed, of the silencer.

Particularly, according to the sixth aspect, the wire harness can be fixed using the clip. At this time, it is possible to suppress a protrusion of the clip to an outer side of the main surface located on the opposite side of the main surface, on which the wire harness is disposed, of the silencer.

Particularly, according to the seventh aspect, a locking state is stabilized compared to a case where the second member is directly locked to the through hole in the silencer.

Particularly, according to the eighth aspect, the fixing member and the silencer sandwich the portion of the sheet material, thereby being able to fix the wire harness easily.

Particularly, according to the ninth aspect, the wire harness having the circular cross section can be fixed to the silencer.

DESCRIPTION OF EMBODIMENT(S)

First Embodiment

Figure 1:
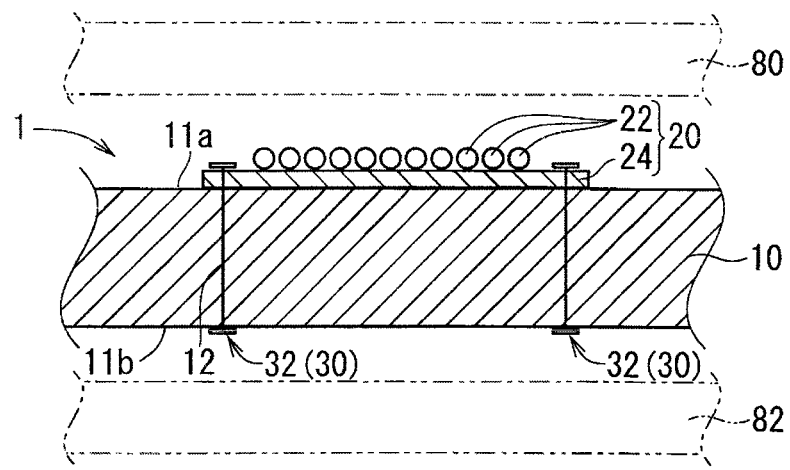
FIG. 1 A schematic cross-sectional view illustrating the wire harness fixing structure according to a first embodiment.
Figure 2:
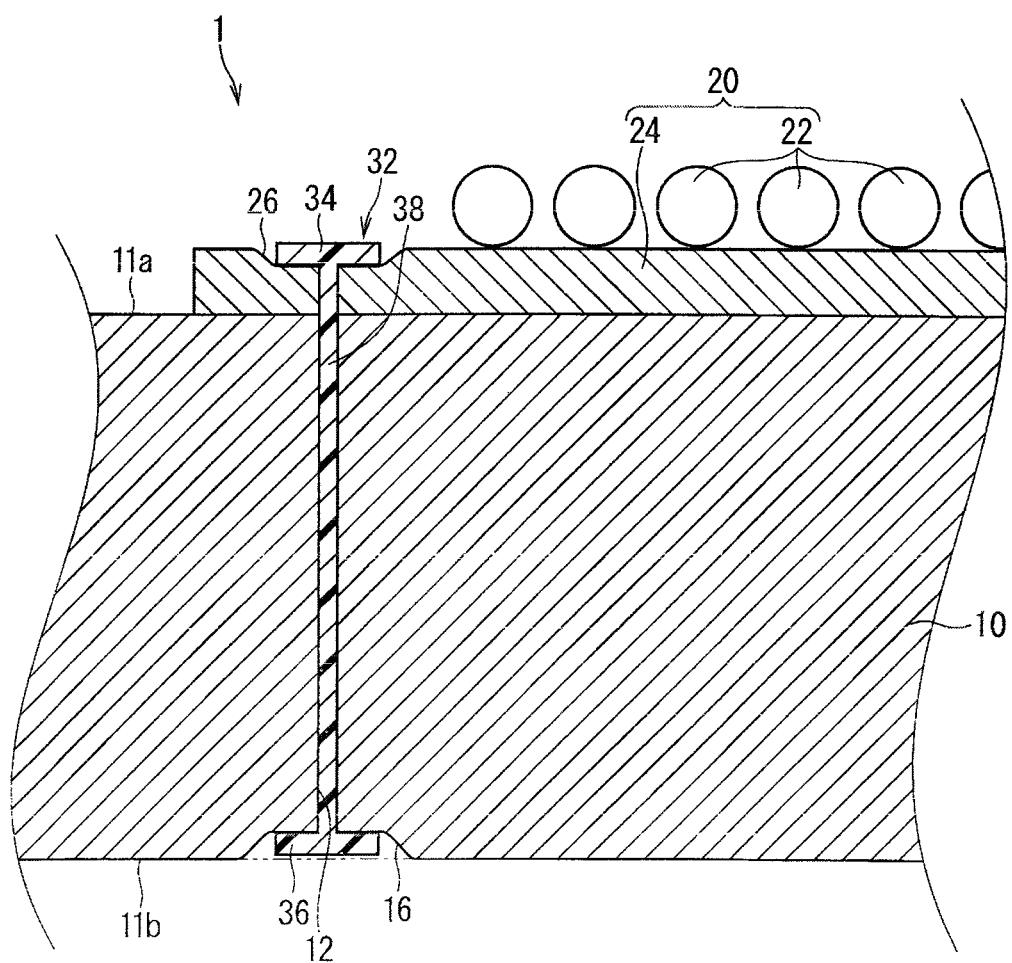
FIG. 2 A partial enlarged view of FIG. 1.

A wire harness fixing structure according to a first embodiment is described hereinafter. FIG. 1 is a schematic cross-sectional view illustrating a wire harness fixing structure 1 according to the first embodiment. FIG. 2 is a partial enlarged view of FIG. 1.

The wire harness fixing structure 1 includes a silencer 10, a wire harness 20 disposed along a main surface 11a of the silencer 10, and a fixing member 30 fixing the wire harness 20 to the silencer 10. Described in the present embodiment is a case where a tag pin-like member 32 is used as the fixing member 30.

The silencer 10 is a member disposed between a floor mat 80 and a body 82 in a vehicle. A through hole 12 is formed to pass through the silencer 10 in a thickness direction.

The silencer 10 is formed into a plate-like shape by a material having acoustic insulation properties. In the description herein, the silencer 10 is formed by mixing a chip of a resin foam such as foamed polyurethane with an adhesive agent (binder) applied to the chip and then compressing and integrally fixing them under vapor atmosphere. A known adhesive agent, such as a urethane chip adhesive agent, according to a material of the chip can be applied as the adhesive agent. A method of manufacturing the silencer 10 is not limited thereto described above. For example, the silencer 10 may be formed by foaming a resin material such as polyurethane and performing mold forming on the resin material, or also may be formed of a material of a non-woven fabric. For example, a silencer body part is formed of numberless compressed fibrous members. In this case, the numberless fibrous members may be entangled with and bonded to each other, or may also be fixed by an adhesive agent, for example. The fibrous members may be made up of natural fiber or chemical fiber. In the example illustrated in FIG. 1, the silencer 10 is flatly formed, but may have a portion with concave and convex in a thickness direction for purpose of following a shape of the floor mat 80 or the body 82 or partially adding a volume of the silencer 10.

The through hole 12 is formed to pass the fixing member 30 through the silencer 10 in the thickness direction. An inner peripheral surface of the through hole 12 in the silencer 10 is closely attached to the fixing member 30. As described above, the silencer 10 is mainly made up of a resin foam herein. That is to say, the silencer 10 is porous and has numberless bubbles. Thus, even in the case where the inner peripheral surface of the through hole 12 in the silencer 10 is closely attached to the fixing member 30, there may be a portion which is not closely attached to the fixing member 30 such as a portion where the bubble appears on the inner peripheral surface when viewed partially. Each of the numberless bubbles may be continued or separated from each other.

Figure 3:
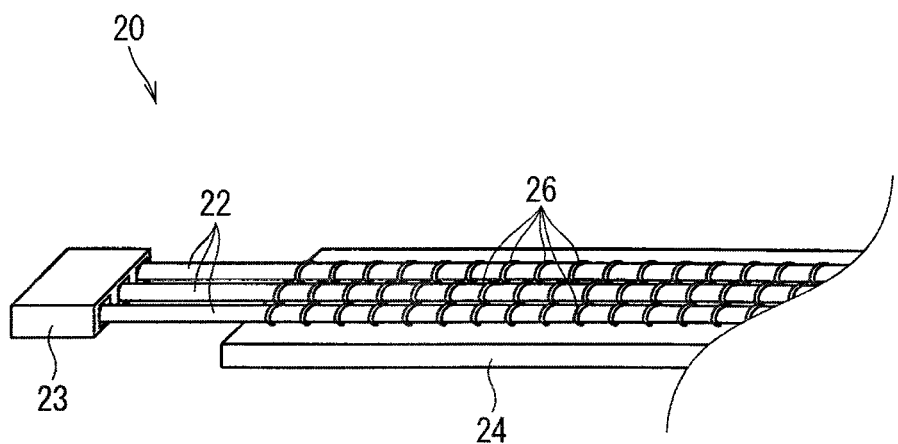
FIG. 3 A perspective view illustrating the wire harness according to the first embodiment.
Figure 4:
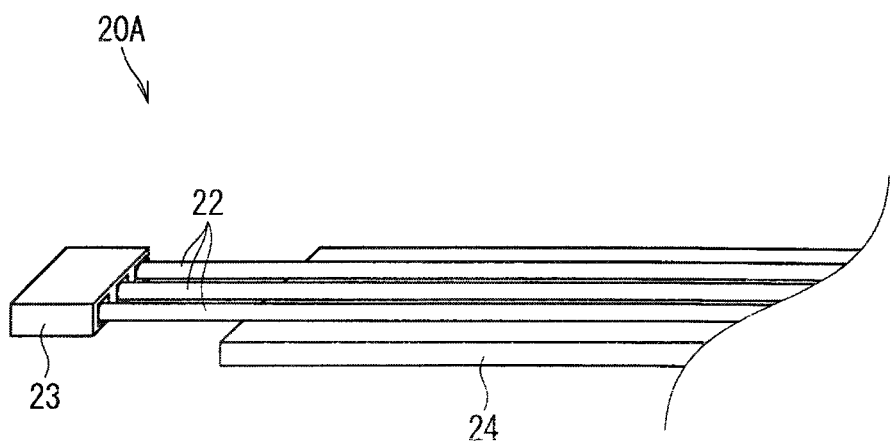
FIG. 4 A perspective view illustrating a wire harness according to a modification example.

FIG. 3 is a perspective view of a wire harness 20 according to the first embodiment. FIG. 4 is a perspective view illustrating a wire harness 20A according to a modification example.

The wire harnesses 20 and 20A include electrical wires 22 and are flatly formed. Herein, the electrical wires 22 are fixed to a sheet material 24 so that the wire harnesses 20 and 20A are flatly formed. A material constituting the sheet material 24 is not particularly limited, but a resin, metal, and a natural fiber can be applied. The sheet material 24 may have a uniform filled cross section by extrusion molding, for example. The sheet material 24 may be a woven cloth, a knitted cloth, or a non-woven cloth, for example. The electrical wire 22 may be an insulating wire having a core wire and the insulating covering formed around the core wire or a so-called bare wire made up only of the core wire. The core wire may be a single core wire or a stranded wire. The wire harness may be flatly formed by a means separately from the sheet material 24 such as a flexible flat cable (FFC) in which a covering is integrally applied around a plurality of core wires extending in parallel with each other, for example. A method of fixing the electrical wire 22 is different from that of fixing the sheet material 24 between the wire harness 20 and the wire harness 20A.

Particularly, the electrical wire 22 is sewn and fixed to the sheet material 24 by a thread 26 in the wire harness 20. In this case, the electrical wire 22 can be sewn to the sheet material 24 using a sewing machine. At this time, a needle thread and a bobbin thread as a machine-sewing thread 26 may be provided separately from the electrical wire 22, or the electrical wire 22 may be used as one of the needle thread and the bobbin thread. Needless to say, the electrical wire 22 may be sewn by hand.

The electrical wire 22 is welded and fixed to the sheet material 24 in the wire harness 20A. In this case, the covering of the electrical wire 22 is preferably welded to the sheet material 24. For example, an ultrasonic welding, a laser welding, and a thermal welding can be adopted as the welding method.

The electrical wire 22 is not necessarily fixed to the sheet material 24 by sewing or welding. The electrical wire 22 may be fixed to the sheet material 24 by a means other than the sewing and the welding. Also considered is that the electrical wire 22 and the sheet material 24 are fixed to each other by an adhesive agent and a double-sided tape, for example.

The plurality of electrical wires 22 are flatly disposed in the wire harnesses 20 and 20A, however, this configuration is not necessary. For example, the plurality of electrical wires 22 may be in a bundle state. A connector 23 is provided on the end portion of the electrical wire 22 while the end portion extends from the sheet material 24, however, this configuration is not necessary. For example, the connector 23 may be provided in a position overlapping with the sheet material 24.

In the wire harness fixing structure 1 according to the present embodiment, the sheet material 24 is sandwiched between the tag pin-like member 32 and the silencer 10, thus the wire harness 20 (20A) is fixed to the silencer 10. The sheet material 24 is located between a first locking part 34 described hereinafter in the tag pin-like member 32 and the silencer 10.

In the example illustrated in FIG. 1, the wire harness 20 is disposed on the main surface 11a, which faces a floor mat 80 side, of the silencer 10, however, this configuration is not necessary. There may also be a case where the wire harness 20 is disposed on a main surface 11b, which faces a body 82 side, of the silencer 10.

The fixing member 30 fixes the wire harness 20 to the silencer 10 while being passed through the through hole 12. As described above, the tag pin-like member 32 is used as the fixing member 30 herein. The tag pin-like member 32 has the first locking part 34, a second locking part 36, and a connection part 38 connecting the first locking part 34 and the second locking part 36. The tag pin-like member 32 is considered an integrated molded component made of resin, for example. At this time, the tag pin-like member 32 is considered to have higher rigidity than the silencer 10.

Each of the first locking part 34 and the second locking part 36 are formed into a rod-like shape. The first locking part 34 and the second locking part 36 are locked to an outer side of one of the main surfaces 11a and 11b of the silencer 10. Herein, the first locking part 34 is located on an outer side of the main surface 11a, on which the wire harness 20 is disposed, of the silencer 10. The second locking part 36 is located on an outer side of the main surface 11b located on an opposite side of the main surface 11a, on which the wire harness 20 is disposed, of the silencer 10. Accordingly, herein, the first locking part 34 and the second locking part 36 are located opposite each other with the silencer 10 therebetween. Herein, the first locking part 34 and the second locking part 36 are formed into the same shape, however, this configuration is not necessary. One of them may be formed into a shape, such as a plate piece-like shape, other than the rod-like shape. In this case, the locking part formed into the shape other than the rod-like shape may be locked to the main surface 11a side, or may also be locked to the main surface 11b side.

The connection part 38 is formed into a rod-like shape. The connection part 38 connects middle portions of the first locking part 34 and the second locking part 36. The connection part 38 extends in a direction intersecting with an extension direction (a direction perpendicular to an extension direction herein) of the first locking part 34 and the second locking part 36. At this time, the connection part 38 passes through the silencer 10. Furthermore, herein, the connection part 38 passes through the sheet material 24. In the description herein, the connection part 38 extends along a normal line direction of the main surfaces 11a and 11b of the silencer 10, however, there may also be a case where the connection part 38 extends along a direction inclined from the normal line direction of the main surfaces 11a and 11b of the silencer 10.

Herein, in the silencer 10, the portion through which the connection part 38 passes is defined as the through hole 12 described above. The through hole 12 is formed when the tag pin-like member 32 is driven into the silencer 10. This configuration is described in detail hereinafter.

In the main surface 11b located on the opposite side of the main surface 11a, on which the wire harness 20 is disposed, of the silencer 10, a portion to which at least one of the first locking part 34 and the second locking part 36 in the tag pin-like member 32 is locked is concaved in a thickness direction with respect to a surrounding area of the portion. Herein, a portion, to which the second locking part 36 is locked, in the main surface 11b of the silencer 10 is concaved in the thickness direction with respect to the surrounding area of the portion. The concaved portion is referred to a concave portion 16 hereinafter. The concave portion 16 may be previously formed, or may also be formed when the silencer 10 is compressed by the tag pin-like member 32 at the time of locking the tag pin-like member 32. In the description hereinafter, the concave portion 16 is formed when the silencer 10 is compressed by the tag pin-like member 32 at the time of locking the tag pin-like member 32.

For example, the concave portion 16 can be formed by setting a length dimension of the connection part 38 to be smaller than a sum of a thickness dimension of the silencer 10 and a thickness dimension of the sheet material 24. Even in a case where the length dimension of the connection part 38 is equal to or larger than the sum of the thickness dimension of the silencer 10 and the thickness dimension of the sheet material 24, the concave portion 16 can be formed when the connection part 38 extends along the direction inclined from the normal line direction of the main surfaces 11a and 11b of the silencer 10 and a path length of the connection part 38 is thereby larger than the length dimension of the connection part 38.

Herein, a portion to which the first locking part 34 is locked in the sheet material 24 is also concaved in the thickness direction with respect to the surrounding area of the portion. The concaved portion is referred to a concave portion 25 hereinafter. The concave portion 25 may not be generated. For example, it is considered that the concave portion 25 is hardly generated (a depth dimension of the concave portion 25 decreases) as the rigidity of the sheet material 24 gets higher than the rigidity of the silencer 10.

A depth dimension of the concave portion 16 (a dimension of the silencer 10 along the thickness direction) is preferably larger than a thickness dimension of the second locking part 36. Since the second locking part 36 is completely fit in the concave portion 16 as illustrated in FIG. 2, a protrusion of the second locking part 36 from the surround portion of the silencer 10 can be suppressed, thus the second locking part 36 hardly comes in contact with a surrounding member. The depth dimension of the concave portion 16 is determined in accordance with a thickness dimension of the silencer 10, a thickness dimension of the sheet material 24, a length dimension of the connection part 38, an extension direction of the connection part 38, and a depth dimension of the concave portion 25, for example.

Figure 5:
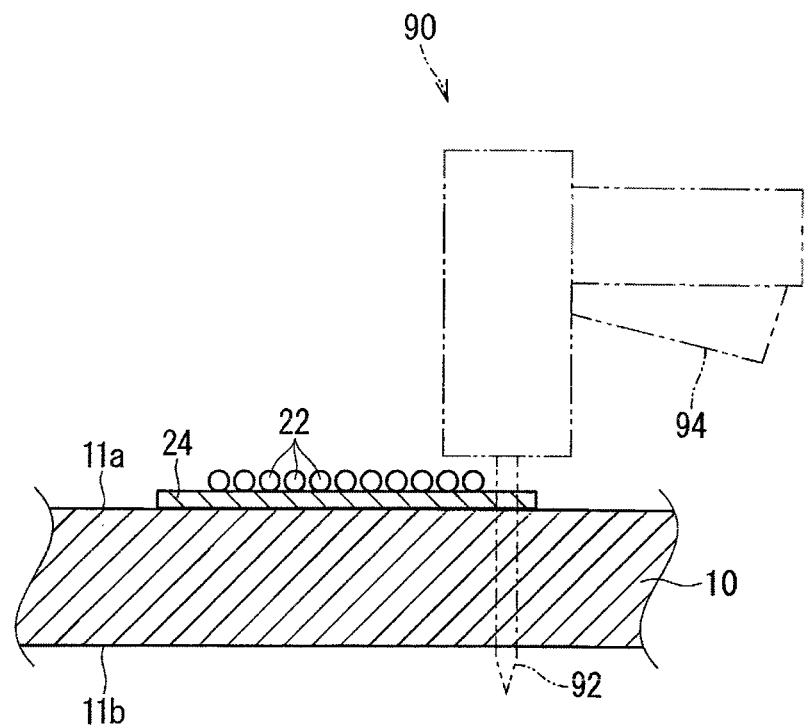
FIG. 5 An explanation diagram illustrating a state where a tag pin-like member is driven into a silencer.

FIG. 5 is an explanation diagram illustrating a state where the tag pin-like member 32 is driven into the silencer 10.

The tag pin-like member 32 can be driven into a member to which the tag pin-like member 32 is to be locked by a known device such as a locking piece attachment device described in Japanese Patent Application Laid-Open No. 6-263127, for example. FIG. 5 illustrates a handheld tag gun 90 as an example of such a device. The tag gun 90 includes a needle 92 with a groove capable of guiding the tag pin-like member 32, for example. Then, a trigger 94 is pulled in a state where the needle 92 passes through the member to which the tag pin-like member 32 is locked as illustrated in FIG. 5. One end potion of the tag pin-like member 32 is thereby driven out to move along the groove. The one end portion of the tag pin-like member 32 which has been driven out is locked to the outer side of the one main surface of the member to which the tag pin-like member 32 is locked. At this time, the other end portion of the tag pin-like member 32 remains on the outer side of the other main surface of the member to which the tag pin-like member 32 is locked. Subsequently, the needle 92 is pulled out of the member to which the tag pin-like member 32 is locked, thus the operation of driving the tag pin-like member 32 into the silencer 10 is completed.

Accordingly, the needle 92 in the tag gun 90 is inserted herein, thereby forming the through hole 12. Thus, even when the through hole 12 is not previously provided in the silencer 10, the tag pin-like member 32 can be easily driven into the silencer 10 using the tag gun 90, for example.

The needle 92 can be inserted into the silencer 10 without removing the silencer 10 in the insertion of the needle 92 in the tag gun 90 into the silencer 10. Thus, the inner peripheral surface of the through hole 12 generated when the connection part 38 is passed after the needle 92 is pulled out is closely attached to the connection part 38 easily, and reduction in acoustic insulation due to the generation of the through hole 12 can be suppressed.

The tag gun 90 described above is a handheld-type gun, however, a stationary-type device may also be applied. The tag gun 90 is a handheld-type gun, however, a device having a drive source such as a motor may also be applied.

According to the configuration described above, the wire harness 20 formed as a separated body can be easily fixed to the silencer 10 by the fixing member 30. At this time, the inner peripheral surface of the through hole 12 in the silencer 10 is closely attached to the fixing member 30, thus the reduction in the acoustic insulation due to the generation of the through hole 12 can be suppressed.

Even when the through hole 12 is not previously provided in the silencer 10, the tag pin-like member 32 can be easily driven into the silencer 10 using the tag gun 90, for example. Particularly when the tag pin-like member 32 is used, the fixation operation can be performed from one surface, an operation from a rear surface is not necessary even in a large member such as the silencer 10, thus the operation can be performed easily. The through hole 12 formed when the tag pin-like member 32 is driven is not accompanied with the removal of the silencer 10, thus the inner peripheral surface of the through hole 12 is closely attached to the connection part 38 easily, and the reduction in the acoustic insulation due to the generation of the through hole 12 can be suppressed.

The first locking part 34 and the second locking part 36 are locked opposite each other to the silencer 10, thus the wire harness 20 can be fixed to the silencer 10 by the relatively short tag pin-like member 32.

The concave portion 16 is formed, thus it is possible to suppress the protrusion of the tag pin-like member 32 to an outer side of the main surface 11b located on the opposite side of the main surface 11a, on which the wire harness 20 is disposed, of the silencer 10.

The tag pin-like member 32 and the silencer 10 sandwich the portion of the sheet material 24, thereby being able to fix the wire harness 20 easily.

Second Embodiment

Figure 6:
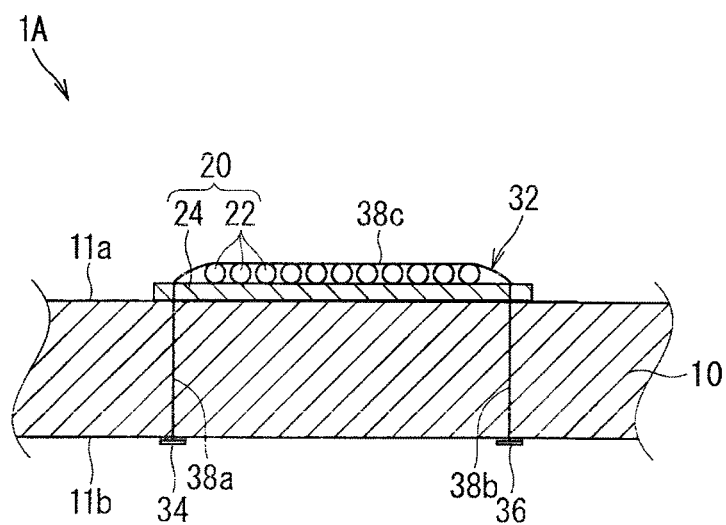
FIG. 6 A schematic cross-sectional view illustrating a wire harness fixing structure according to a second embodiment.

A wire harness fixing structure according to a second embodiment is described. FIG. 6 is a schematic cross-sectional view illustrating a wire harness fixing structure 1A according to the second embodiment. In the description of the present embodiment, the same reference numerals are assigned to the similar constituent elements described above, and the description thereof will be omitted. The same applies to the description of each embodiment and modification example hereinafter.

In the wire harness fixing structure 1A according to the second embodiment, the configuration of fixing the tag pin-like member 32 is different from that in the wire harness fixing structure 1 according to the first embodiment. Specifically, in the wire harness fixing structure 1A, the first locking part 34 and the second locking part 36 are locked on the same main surface 11b side of the silencer 10. Accordingly, both one end portion 38a on a first locking part 34 side and the other end portion 38b on a second locking part 36 side in the connection part 38 pass through the silencer 10 in positions away from each other. Thus, a middle portion 38c between the one end portion 38a and the other end portion 38b of the connection part 38 is exposed to an outer side of the silencer 10.

At this time, the first locking part 34 and the second locking part 36 are locked to the main surface 11b side located on the opposite side of the main surface 11a, on which the wire harness 20 is disposed, of the silencer 10. The wire harness 20 is sandwiched between the silencer 10 and the exposed middle portion 38c in the connection part 38. A portion including the electrical wire 22 in the wire harness 20 is sandwiched between the silencer 10 and the exposed middle portion 38c in the connection part 38. Particularly, all of the electrical wires 22 are sandwiched between the silencer 10 and the middle portion 38e herein.

Applicable as a device locking the tag pin-like member 32 bended into a U-shape in such a manner to the silencer 10 is a known two-needle device having the two needles 92 in the tag gun 90 described above such as a locking piece attachment device described in Japanese Patent Application Laid-Open No. 10-59338, for example. Even in this case, the fixation operation can be performed from one surface, thus an operation from a rear surface is not necessary even in a large member such as the silencer 10, and the operation can be performed easily.

Herein, even when the first locking part 34 and the second locking part 36 are locked to the main surface 11b side located on the opposite side of the main surface 11a, on which the wire harness 20 is disposed, of the silencer 10, there may also be a case where the portion including the electrical wire 22 in the wire harness 20 is not sandwiched between the silencer 10 and the exposed middle portion 38c in the connection part 38. Considered as such a case is case where only the sheet material 24 in the wire harness 20 is sandwiched between the silencer 10 and the exposed middle portion 38c in the connection part 38. Even when the portion including the electrical wire 22 is sandwiched, there may also be a case where only part of the electrical wire 22 is sandwiched.

According to the present embodiment, the fixation state of the wire harness 20 is stabilized, and the wire harness 20 is hardly influenced by a vibration, for example. Particularly, the tag pin-like member 32 has the simple configuration, thus has a little influence.

Third Embodiment

Figure 7:
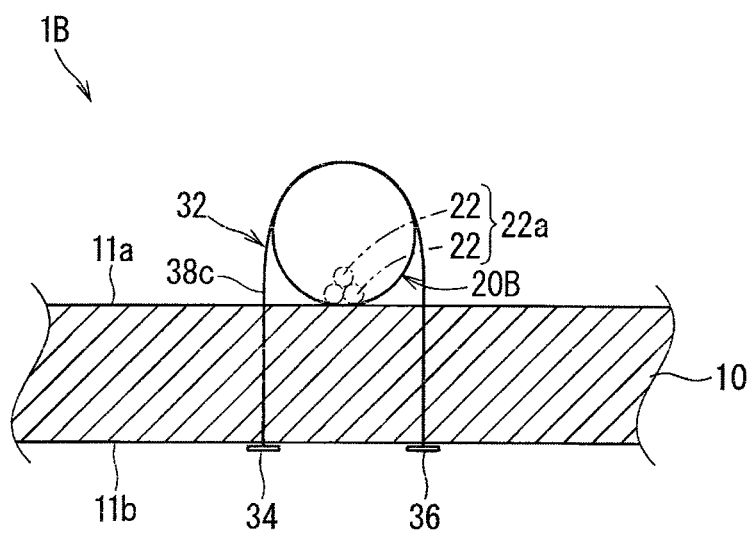
FIG. 7 A schematic cross-sectional view illustrating a wire harness fixing structure according to a third embodiment.

A wire harness fixing structure according to a third embodiment is described. FIG. 7 is a schematic cross-sectional view illustrating a wire harness fixing structure 1B according to the third embodiment.

In the wire harness fixing structure 1B according to the third embodiment, a shape of a wire harness 20B is different from that of the wire harness 20 in the wire harness fixing structure 1A according to the second embodiment.

Specifically, the plurality of electrical wires 22 in the wire harness 20B in the wire harness fixing structure 1B are bundled into a circular shape in cross section to form an electrical wire bundle 22a. A banding member such as an adhesive tape or a banding band not shown in the drawings, for example, is wound around the plurality of electrical wires 22, thus the plurality of electrical wires 22 are bundled into the circular shape in cross section. The adhesive tape is spirally wound or partially wound at intervals, for example. For example, a tubular member such as a corrugated tube is externally mounted on the plurality of electrical wires 22, or a sheet material is wound around the plurality of electrical wires 22, thus the plurality of electrical wires 22 are bundled into the circular shape in cross section.

The electrical wire bundle 22a bundled into the circular shape in cross section is fixed to the silencer 10 by the tag pin-like member 32. At this time, in the manner similar to the wire harness fixing structure 1A according to the second embodiment, the first locking part 34 and the second locking part 36 are locked to the main surface 11b side located on the opposite side of the main surface 11a, on which the wire harness 20 is disposed, of the silencer 10. The electrical wire bundle 22a is sandwiched between the silencer 10 and the exposed middle portion 38c in the connection part 38.

According to the present embodiment, the wire harness 20B having the circular cross section can be fixed to the silencer 10.

Fourth Embodiment

Figure 8:
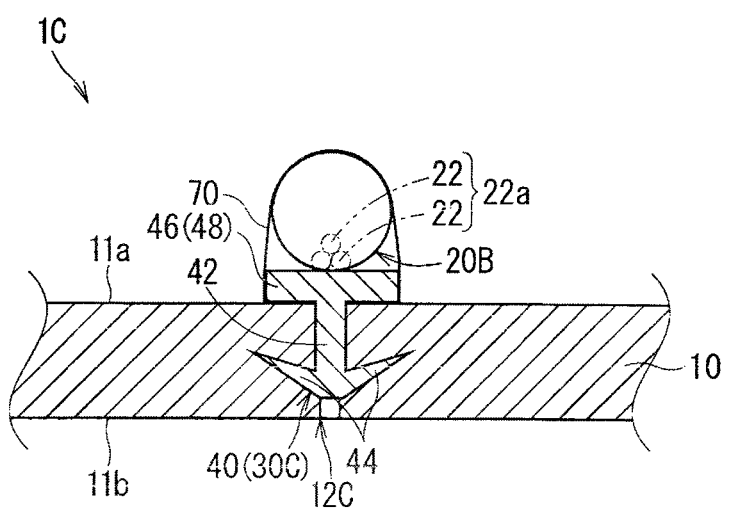
FIG. 8 A schematic cross-sectional view illustrating a wire harness fixing structure according to a fourth embodiment.
Figure 9:
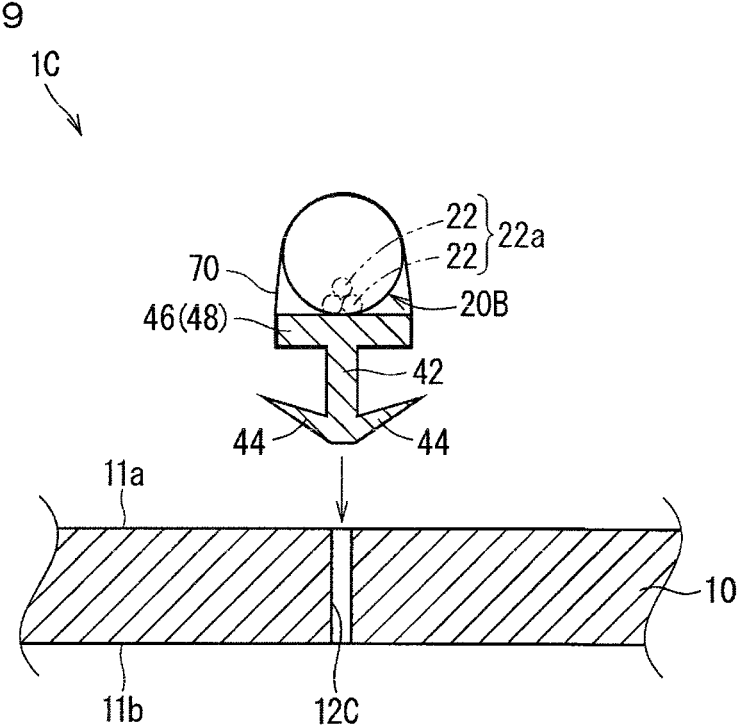
FIG. 9 A schematic exploded cross-sectional view illustrating the wire harness fixing structure according to the fourth embodiment.
Figure 10:
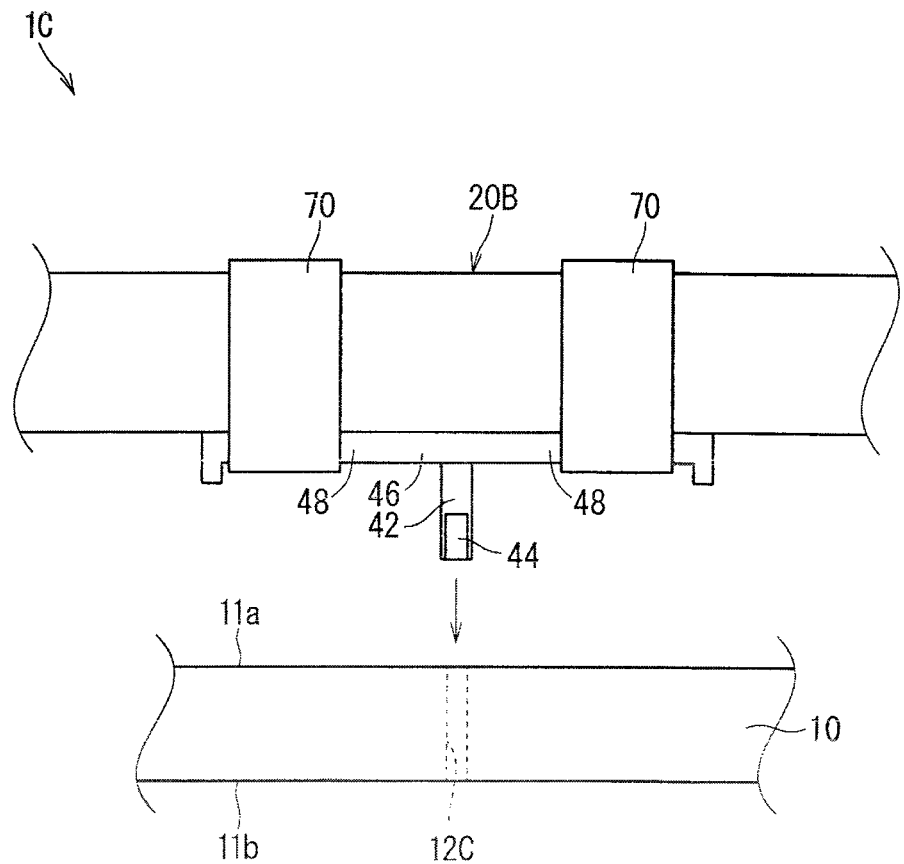
FIG. 10 A schematic exploded side view illustrating the wire harness fixing structure according to the fourth embodiment.

A wire harness fixing structure according to a fourth embodiment is described. FIG. 8 is a schematic cross-sectional view illustrating a wire harness fixing structure 1C according to the fourth embodiment. FIG. 9 is a schematic exploded cross-sectional view illustrating the wire harness fixing structure 1C according to the fourth embodiment. FIG. 10 is a schematic exploded side view illustrating the wire harness fixing structure 1C according to the fourth embodiment.

In the wire harness fixing structure 1C according to the fourth embodiment, a shape of a fixing member 30C is different from that of the fixing member 30 in the wire harness fixing structure 1B according to the third embodiment.

Specifically, a clip 40 is used as the fixing member 30C herein. The clip 40 is inserted into and locked to a through hole 12C formed in the silencer 10. In the description herein, the through hole 12C is previously formed in the silencer 10. Also in the description herein, part of the silencer 10 is removed or a hole is widened without removing part of the silencer 10, thus the through hole 12C has a width as illustrated in FIG. 9. More specifically, the clip 40 has a supporting column part 42 and a locking piece 44. Herein, the clip 40 further has an insertion regulating part 46 and a harness fixing part 48.

The supporting column part 42 is formed larger (slightly larger herein) than the through hole 12C. The supporting column part 42 is fit in the through hole 12C. The insertion regulating part 46 is provided on a base end of the supporting column part 42, and the insertion regulating part 46 extends to form the harness fixing part 48.

The locking piece 44 is provided on a tip of the supporting column part 42. The locking piece 44 is formed larger than the through hole 12C. The locking piece 44 is locked to the through hole 12C formed in the silencer 10. The locking piece 44 is locked to a position of a middle portion in the through hole 12C. The locking piece 44 is formed into a shape gradually spreading outward toward the base end of the supporting column part 42. Herein, the two locking pieces 44 are formed to protrude to both sides of the supporting column part 42.

The insertion regulating part 46 is formed on the base end of the supporting column part 42. The insertion regulating part 46 regulates a further insertion of the supporting column part 42 into the through hole 12C. The insertion regulating part 46 is formed into a plate-like shape larger than the supporting column part 42. The insertion regulating part 46 herein is formed into a plate-like shape larger than the through hole 12C. Accordingly, the insertion regulating part 46 cannot be inserted into the through hole 12C. Herein, the insertion regulating part 46 is formed into a rectangular plate-like shape. The harness fixing part 48 is provided in a state of extending from the insertion regulating part 46.

The harness fixing part 48 is a part fixing the wire harness. Herein, part of the insertion regulating part 46 extends in a direction intersecting with an extension direction of the supporting column part 42, and the extended part constitutes the harness fixing part 48. The banding member 70 such as an adhesive tape or a banding band, for example, is wound around the harness fixing part 48 and the wire harness 20B, thus the wire harness 20B is fixed to the harness fixing part 48.

The banding member 70 fixing the wire harness 20B to the harness fixing part 48 doubles as a function as the banding member bundling the plurality of electrical wires 22 into the circular shape in cross section. In this case, it is also considered that in the part of the wire harness 20B fixed to the harness fixing part 48, the part where the adhesive tape is spirally wound is omitted.

Herein, the two harness fixing parts 48 are provided to extend to the both sides of the insertion regulating part 46 in the example illustrated in FIG. 3, however, this configuration is not necessary. For example, only one harness fixing part 48 may be provided to extend to only one side of the insertion regulating part 46.

The harness fixing part 48 is also considered to be connected to the insertion regulating part 46 via an offset part. The offset part is a part shifting positions of the harness fixing part 48 and the supporting column part 42 viewed from the extension direction of the supporting column part 42, for example. For example, the offset part is provided to extend in a first direction intersecting with the extension direction of the supporting column part 42 on the insertion regulating part 46. At this time, the harness fixing part 48 is provided on a tip side of the offset part to extend in a second direction intersecting with the first direction, in which the offset part extends, on the offset part.

The clip 40 is considered an integrated molded component made of resin using a mold, for example.

In the description herein, the clip 40 is formed of a material having higher rigidity than the silencer 10. In this case, when the clip 40 is inserted into the through hole 12C, mainly the silencer 10 is elastically deformed. That is to say, the silencer 10 is elastically deformed so that the through hole 12C is equal to or larger than the locking piece 44. At this time, the locking piece 44 may be formed to be elastically deformed easily to be small, or also may be formed to be hardly elastically deformed.

In the example illustrated in FIG. 8, the tip of the locking piece 44 breaks through an inner peripheral surface of the through hole 12C to reach an inner side of the silencer 10. There may also be a case where the tip of the locking piece 44 does not break through the inner peripheral surface of the through hole 12C. In this case, it is considered that the inner peripheral surface of the through hole 12C is pressed by the tip of the locking piece 44, thus part of the through hole 12C where the tip of the locking piece 44 is located is widened to an outer periphery side compared with part thereof located nearer the main surface 11a side.

According to the present embodiment, the wire harness 20 can be fixed using the clip 40. At this time, the locking piece 44 is locked to the position of the middle portion in the through hole 12C, thus it is possible to suppress the protrusion of the clip 40 to an outer side of the main surface 11b located on the opposite side of the main surface 11a, on which the wire harness 20B is disposed, of the silencer 10.

Fifth Embodiment

Figure 11:
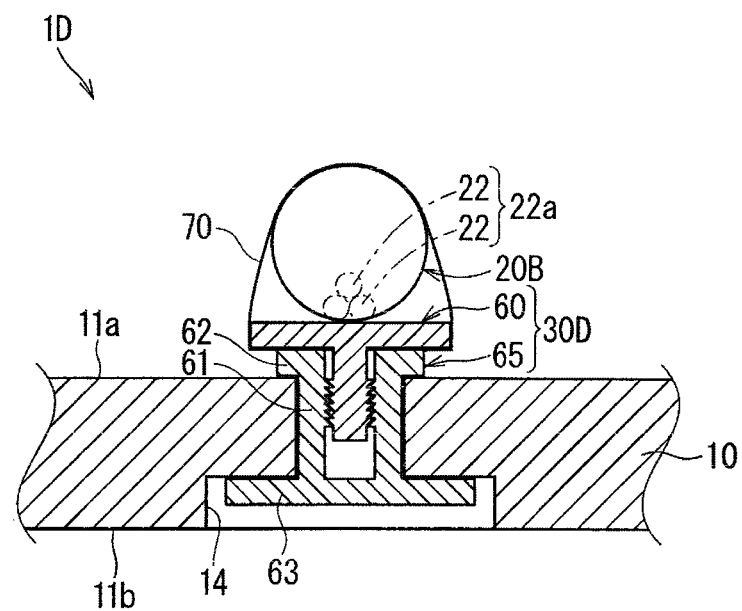
FIG. 11 A schematic cross-sectional view illustrating a wire harness fixing structure according to a fifth embodiment.
Figure 12:
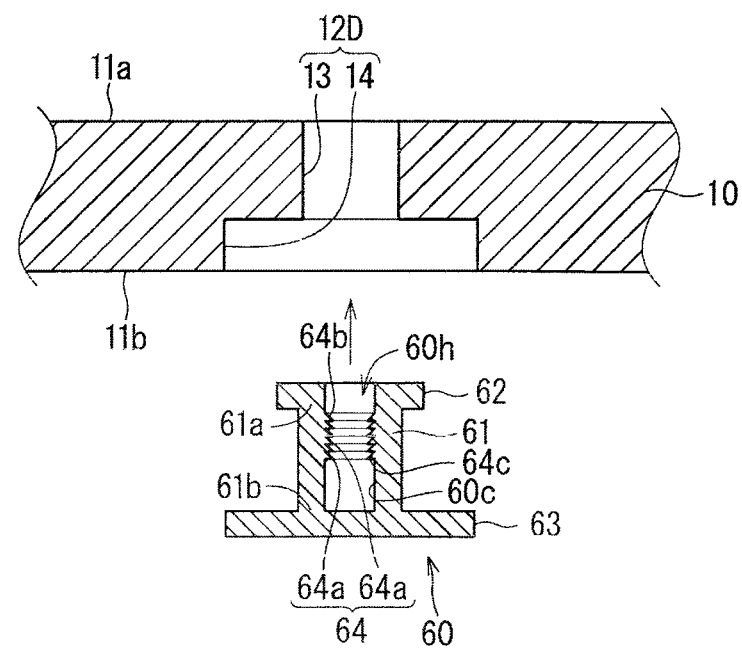
FIG. 12 An explanation diagram illustrating a state where a first member is attached to a silencer.
Figure 13:
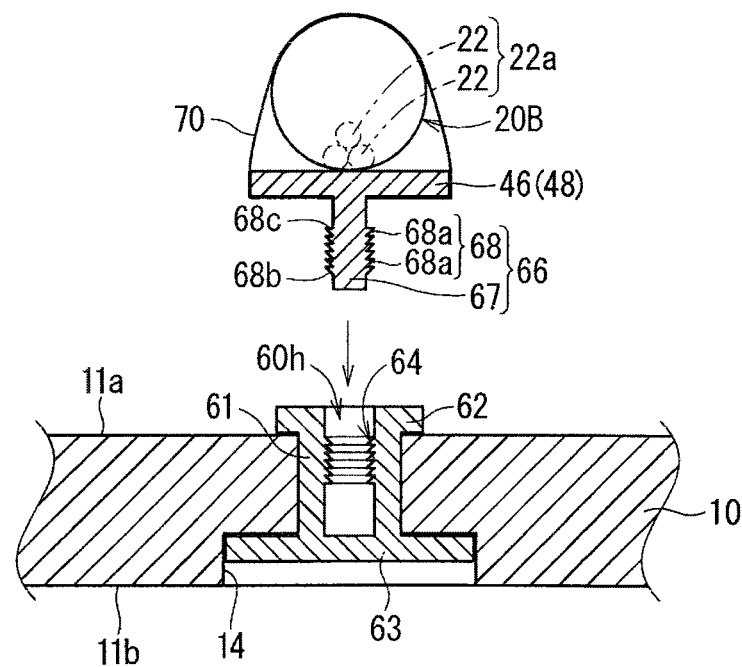
FIG. 13 An explanation diagram illustrating a state where a second member is attached to the first member.

A wire harness fixing structure according to a fifth embodiment is described. FIG. 11 illustrates a schematic cross-sectional view of a wire harness fixing structure 1D according to the fifth embodiment. FIG. 12 is an explanation diagram illustrating a state where a first member 60 is attached to the silencer 10. FIG. 13 is an explanation diagram illustrating a state where a second member 65 is locked to the first member 60.

The wire harness fixing structure 1D according to the present embodiment is different from the wire harness 20C according to the fourth embodiment in that a fixing member 30D is made up of two components. Specifically, the fixing member 30 includes the first member 60 and the second member 65. The first member 60 is fixed to the silencer 10 while being passed through a through hole 12D formed in the silencer 10.

The through hole 12D is described firstly herein. In the description herein, the through hole 12D is previously formed. The through hole 12D is formed into a shape having a first hole 13 and a second hole 14 larger than the first hole 13 along an axial direction. Herein, the first hole 13 is located nearer the main surface 11a side where the wire harness 20B is disposed in relation to the second hole 14.

The first member 60 is made of a material, such as a non-foam resin, having higher rigidity than the silencer 10, for example. The first member 60 sandwiches a peripheral edge part (a peripheral edge part of the first hole 13 herein) of the through hole 12D, and is fixed thereto. Specifically, the first member 60 includes a shaft 61, a flange part 62, and a retaining part 63. A bottomed hole 60h is formed in the first member 60. A locking protrusion part 64 is further formed in the first member 60 herein. The locking protrusion part 64 and a locking protrusion part 68 described hereinafter in the second member 65 are locked to each other.

The shaft 61 is formed into a rod-like shape. One end portion 61a of the shaft 61 is exposed to the main surface 11a side, where the wire harness 20B is disposed, of the silencer 10. The shaft 61 extends from the one end portion 61a exposed to the main surface 11a side toward an inner side of the silencer 10. The shaft 61 is formed into a cylindrical shape with both ends thereof opened. The shaft 61 is passed through the first hole 13. At this time, the shaft 61 is formed larger than the first hole 13. Thus, an inner peripheral surface of the first hole 13 is closely attached to the shaft 61.

A tip of the one end portion 61a of the shaft 61 protrudes outside the main surface 11a of the silencer 10. The flange part 62 is provided on a peripheral edge of the protrusion part. Accordingly, the flange part 62 is located on the main surface 11a side, where the wire harness 20B is disposed, of the silencer 10. The flange part 62 is a part preventing the shaft 61 from getting out of the silencer 10, and sandwiches the silencer 10 with the retaining part 63 from the opposite side of the retaining part 63.

The retaining part 63 is a part preventing the shaft 61 from getting out of the silencer 10 in the manner similar to the flange part 62. Specifically, the retaining part 63 continues into the other end portion 61b of the shaft 61. The retaining part 63 is formed larger than the shaft 61. The retaining part 63 is formed larger than the flange part 62, but may also be equal to or smaller than the flange part 62. The retaining part 63 is formed into a plate-like shape such as a disc-like shape or a rectangular plate-like shape, for example. The retaining part 63 does not protrude outside the main surface 11b of the silencer 10. Thus, the retaining part 63 is completely housed in the second hole 14. Accordingly, a contact of the retaining part 63 with a surrounding member can be suppressed. For example, when a thickness dimension of the retaining part 63 is set smaller than a depth dimension of the second hole 14, the retaining part 63 can be completely housed in the second hole 14.

The bottomed hole 60h is made up of the shaft 61 and the retaining part 63 herein. More specifically, a hollow part 61a inside the cylindrical shaft 61 constitutes a hole part of the bottomed hole 60h. At this time, an opening of the hollow part 61a in the other end portion 61b in the shaft 61 is closed by the retaining part 63. Accordingly, the retaining part 63 constitutes a bottom part of the bottomed hole 60h herein. At this time, the one end portion 61a of the shaft 61 is exposed to the main surface side of the silencer 10, thus the opening of the hollow part 61a in the one end portion 61a in the shaft 61 is exposed outside, and forms the opening of the bottomed hole 60h. Then, the second member 65 is inserted from the opening.

Also considered is that the shaft 61 is formed into a cylindrical shape in which the other end portion 61b is closed, thus the bottom part of the bottomed hole 60h is located in a middle portion in the shaft 61.

The locking protrusion part 64 is formed to protrude inward from an inner peripheral surface of the shaft 61. The locking protrusion part 64 includes at least one protrusion 64a (herein, a plurality of protrusions 64a). The protrusion 64a is formed so that a protrusion dimension gradually increases from an opening side toward a bottom side of the bottomed hole 60h. More specifically, the protrusion 64a has an inclined surface 64b inclined with respect to the axial direction and a vertical surface 64c perpendicular to the axial direction. In the protrusion 64a, the inclined surface 64b is directed to the opening side of the bottomed hole 60h, and the vertical surface 64c is directed to the bottom side of the bottomed hole 60h. The plurality of protrusions 64a are formed side by side in the axial direction. The protrusion 64a is formed over a whole circumferential direction. The protrusion 64a may also be formed only in part of a region along the circumferential direction. In this case, also considered is that a plurality of protrusions each having a dimension along the circumferential direction smaller than a half of the periphery are arranged in the circumferential direction.

The first member 60 is considered an integrated molded component made of resin using a mold, for example. The first member 60 is fitted into the through hole 12 in the silencer 10 formed separately from the first member 60, thereby being fixed to the silencer 10. Herein, a process of fitting the first member 60 into the through hole 12 is preferably performed before a process of locking the first member 60 and the second member 65.

The second member 65 is inserted into and locked to the bottomed hole 60h formed in the first member 60. The second member 65 is fixed to the bottomed hole 60h, thereby fixing the wire harness 20B to the silencer 10. Specifically, the second member 65 includes an insertion part 66. Herein, the locking protrusion part 68 is formed in the second member 65. The locking protrusion part 68 and the locking protrusion part 64 formed in the first member 60 are locked to each other. Herein, the second member 65 further includes the insertion regulating part 46 described above and the harness fixing part 48.

The insertion part 66 is formed into a rod-like shape. The insertion part 66 is inserted into and locked to the bottomed hole 60h formed in the shaft 61. The insertion part 66 includes an insertion body part 67 and the locking protrusion part 68.

The insertion body part 67 is formed into a rod-like shape equal to or smaller (slightly smaller herein) than the bottomed hole 60h. Herein, the insertion body part 67 is formed into a column-like shape (a circular column-like shape herein). The insertion body part 67 may be formed into a cylindrical shape. The insertion body part 67 may be divided along a planar surface parallel to the extension direction so as to be elastically deformed easily. In this case, a configuration of division is not particularly limited, however, the insertion body part 67 may be divided into two, three, four, or more.

The locking protrusion part 68 is formed to protrude outward from an outer peripheral surface of the insertion body part 67. The locking protrusion part 68 includes at least one protrusion 68a (herein, a plurality of protrusions 68a). The protrusion 68a is formed so that a protrusion dimension gradually increases from a tip side toward a base end side of the insertion body part 67. Herein, the protrusion 68a has an inclined surface 68b inclined with respect to the axial direction and a vertical surface 68c perpendicular to the axial direction. The protrusion 68a directs the inclined surface 68b toward the tip side and directs the vertical surface 68c toward the base end side. The plurality of the protrusions 68a are formed side by side in the axial direction. The protrusion 68a is formed over a whole circumferential direction. The protrusion 68a may also be formed only in part of a region along the circumferential direction. In this case, also considered is that a plurality of protrusions each having a dimension along the circumferential direction smaller than a half of the periphery are arranged in the circumferential direction.

A configuration of locking the bottomed hole 60h and the insertion part 66 is described herein.

When the insertion body part 67 is inserted into the bottomed hole 60h, the inclined surfaces 64b and 68b of the protrusions 64a and 68a come in contact with each other in due course. When power is continuously applied, the protrusions 64a and 68a being in contact with each other are elastically deformed and guide each other to a far side in an insertion direction. Accordingly, the insertion part 66 is inserted into the bottomed hole 60h. When the insertion regulating part 46 comes in direct contact with an opening peripheral edge (the tip of the shaft 61) of the bottomed hole 60h, the insertion part 66 cannot be further inserted, and the insertion is completed. In the meanwhile, when power is applied to the insertion part 66 inserted into and locked to the bottomed hole 60h in a direction of pulling the insertion part 66 out of the bottomed hole 60h, the vertical surfaces 64c and 68c of the protrusions 64a and 68a are contact with each other, thus the protrusions 64a and 68a are hardly elastically deformed. Accordingly, it is difficult to pull out the insertion part 66 inserted into and locked to the bottomed hole 60h.

Preferably applied is at least one of a configuration that there is no protrusion 64a on the tip of the shaft 61 and a configuration that there is no protrusion 68a on the tip of the insertion body part 67. Thus, a contact of the protrusions 64a and 68a immediately after the insertion of the insertion part 66 into the bottomed hole 60h can be suppressed. As a result, the process of applying the power for elastically deforming the protrusions 64a and 68a can be performed after the insertion part 66 is inserted into the bottomed hole 60h to some degree, thus the power for elastically deforming the protrusions 64a and 68a can be easily applied along the axial direction, and the insertion part 66 can be easily inserted into the bottomed hole 60h. Applied herein are both the configuration that there is no protrusion 64a on the tip of the shaft 61 and the configuration that there is no protrusion 68a on the tip of the insertion body part 67. Accordingly, an insertion dimension of inserting the insertion part 66 until the protrusions 64a and 68a come in contact with each other can be increased.

The second member 65 is considered an integrated molded component made of resin using a mold, for example. At this time, the second member 65 is considered to have higher rigidity than the silencer 10.

According to the present embodiment, a locking state is stabilized compared to a case where the second member 65 is directly locked to the through hole in the silencer 10. The rigidity is still larger compared to the case of the locking using the tag pin-like member 32, thus the wire harness can be securely fixed.

MODIFICATION EXAMPLE

Figure 14:
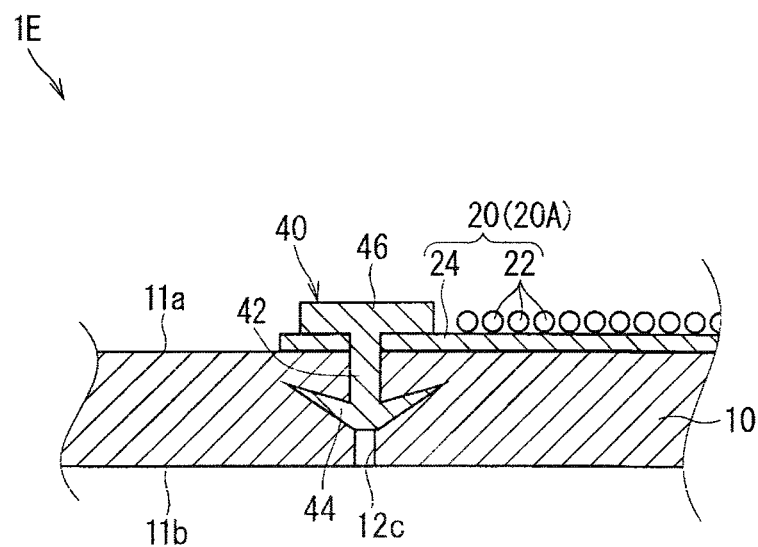
FIG. 14 A schematic cross-sectional view illustrating a modification example of the wire harness fixing structure according to the fourth embodiment.
Figure 15:
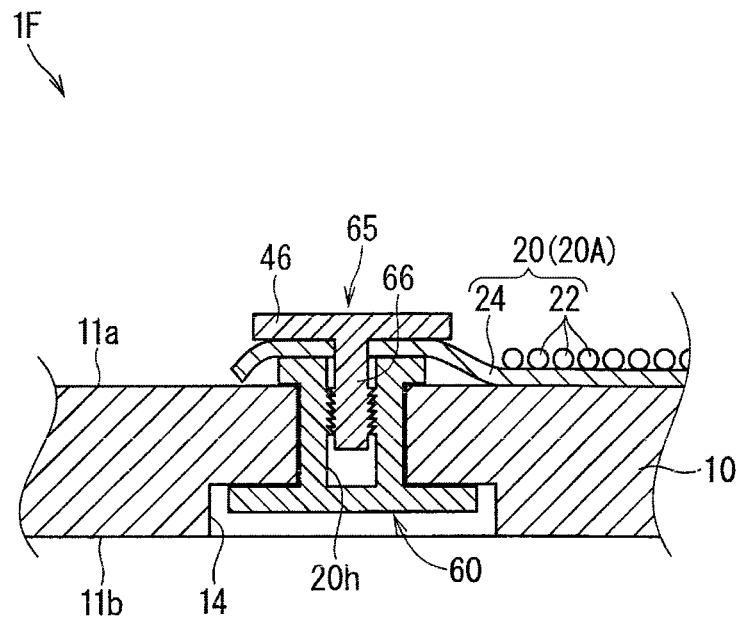
FIG. 15 A schematic cross-sectional view illustrating a modification example of the wire harness fixing structure according to the fifth embodiment.

FIG. 14 is a schematic cross-sectional view illustrating a modification example of the wire harness fixing structure 1C according to the fourth embodiment. FIG. 15 is a schematic cross-sectional view illustrating a modification example of the wire harness fixing structure 1D according to the fifth embodiment.

The examples illustrated in FIG. 14 and FIG. 15 illustrate the wire harness fixing structures 1E and 1F using the wire harness 20 (20A) in which the electrical wire 22 is fixed to the sheet material 24. For example, in the example illustrated in FIG. 14, the sheet material 24 is sandwiched between the silencer 10 and the clip 40 (more specifically, the insertion regulating part 46), thus the wire harness 20 (20A) is fixed to the silencer 10. Particularly, herein, the supporting column part 42 passes through the sheet material 24. In this case, it is also applicable that the clip 40 is previously attached to the sheet material 24 in the wire harness 20 (20A), and the wire harness 20 (20A) to which the clip 40 is attached is transported to an assembly plant to fix the wire harness 20 (20A) to the silencer 10. The same applies to the example illustrated in FIG. 10. The harness fixing part 48 described above for winding the banding member 70 in the clip 40 may be or may not be omitted. When the harness fixing part 48 is not omitted, the harness fixing part 48 described above may be fixed to the sheet material 24, for example. Applicable as the method of fixing the harness fixing part 48 and the sheet material 24 is that part of the sheet material 24 is wound around the harness fixing part 48 or direct contact surfaces are joined to each other by an adhesive agent or a double-sided tape or a means such as welding, for example.

Figure 16:
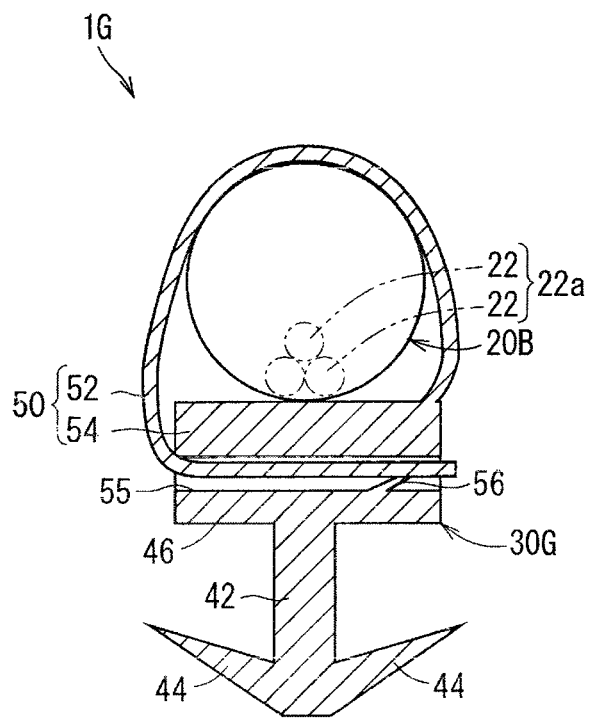
FIG. 16 A schematic cross-sectional view illustrating a modification example of a harness fixing part.

FIG. 16 is a schematic cross-sectional view illustrating a modification example of the harness fixing part 48.

In the above description according to the fourth and fifth embodiments, the harness fixing part 48 is formed into the plate-like shape and the banding member 70 formed as a separated body is wound around the harness fixing part 48 with the electrical wire 22 so that the electrical wire 22 and the clip 40 or the second member 65 are fixed to each other, however, this configuration is not necessary. For example, the fixing member and the banding member as the harness fixing part may be integrally molded. The example illustrated in FIG. 16 illustrates a fixing member 30G in which a banding band structure part 50 is adopted as such a harness fixing part. The fixing member 30G is an example that the supporting column part 42 and the locking piece 44 in the clip 40 described above and the banding band structure part 50 are integrally molded.

The banding band structure part 50 includes a band part 52 and a band fixing part 54 continuing into a base end of the band part 52. The band fixing part 54 can fix a tip of the band part 52 wound around a member to be bound. More specifically, the band fixing part 54 is formed into a rectangular parallelepiped shape. A band insertion hole 55 passing through a pair of main surfaces of the band fixing part 54 is formed in the band fixing part 54. A locking protrusion piece 56 which can be selectively locked to a plurality of concave portions formed in the band part 52 protrudes from an inner peripheral surface of the band insertion hole 55.

In the fixing member 30G, the supporting column part 42 described above protrudes from a main surface other than a main surface from which the band part 52 protrudes with respect to the band fixing part 54. The side of the band fixing part 54 from which the supporting column part 42 protrudes doubles as the insertion regulating part 46 described above.

From another point of view, it can be interpreted that the banding band structure part 50 as the harness fixing part is formed in a state where the thin-walled insertion regulating part 46 extends in the thickness direction. Then, the wire harness 20B is fixed to the fixing member 30G by the banding band structure part 50 integrally molded with the supporting column part 42. Obviously, the banding band structure part 50 may be provided to be integral with the insertion part 66 in the second member 65 according to the fifth embodiment.

Figure 17:
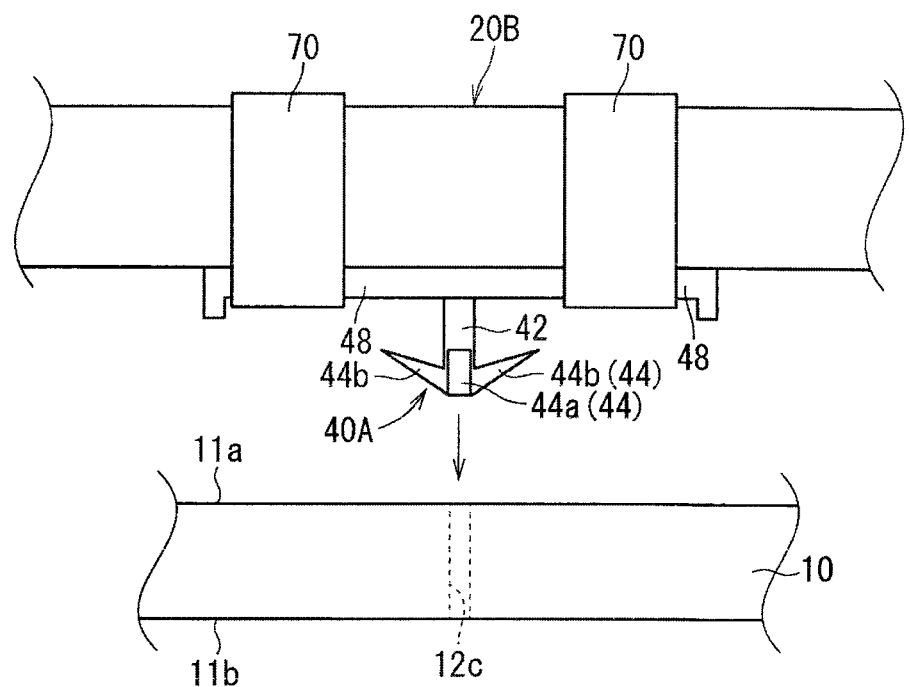
FIG. 17 A schematic side view illustrating a modification example of a locking piece.

FIG. 17 is a schematic side view illustrating a modification example of the locking piece 44.

In the above description of the fourth and fifth embodiments, the two locking pieces 44 are formed to protrude to the both sides of the supporting column part 42, however, the shape of the locking piece 44 is not limited thereto.

For example, in a clip 40A illustrated in FIG. 17, the four locking pieces 44 are formed to extend in four directions from the supporting column part 42. At this time, when the clip 40A is viewed from the extension direction of the supporting column part 42, a pair of locking parts 44a extend to sides opposite to each other from the supporting column part 42. In the similar manner, the other pair of locking parts 44b also extend to sides opposite to each other from the supporting column part 42. A direction in which the pair of locking parts 44a extend and a direction in which the pair of locking parts 44b extend intersect with (are perpendicular to) each other. Accordingly, in the clip 40A, the four locking parts 44 form a cross shape.

For example, the locking piece is also considered to be formed over the whole periphery of the supporting column part 42. In this case, the locking piece has a conical side surface-like (umbrella-like) shape.

In the description according to the first embodiment, the two tag pin-like members 32 are provided along the width direction of the sheet material 24, however, this configuration is not necessary. There may also be a case where one, three or more tag pin-like members 32 are provided along the width direction of the sheet material 24. The tag pin-like member 32 is disposed nearer an edge side of the sheet material 24 in relation to the electrical wire 22, however, there may also be a case where the tag pin-like member 32 is disposed between the electrical wires 22.

In the second embodiment, there may also be a case where the first locking part 34 and the second locking part 36 are locked to the main surface 11a side (the sheet material 24), on which the wire harness 20 is disposed, of the silencer 10.

In the fifth embodiment, the shaft 61 is formed into the cylindrical shape, however, the shape of the shaft 61 is not limited thereto. For example, a plurality of flat plates parallelly extending with a certain distance therebetween may be formed to be the shaft. In this case, a bottomed hole is formed between the plurality of flat plates. Part of the bottomed hole in a circumferential direction (part which is not covered by the flat plate) is covered by the silencer 10. The locking protrusion part is formed on each main surface, which faces each other, of the two flat plates. At this time, an insertion body part in an insertion part inserted into the bottomed hole described above is also formed into a rectangular plate-like shape. Then, the locking protrusion part is formed to protrude outward on both main surfaces of the insertion body part having the rectangular plate-like shape.

In the description according to each embodiment, the silencer 10 is formed separately from the floor mat 80, however, this configuration is not necessary. There may also be a case where the silencer 10 is integral with the floor mat 80 by joining, for example. In this case, a member exposed to a vehicle interior in the integrated component is the floor mat.

The configurations described in the embodiments and modification examples thereof can be appropriately combined as long as they are not contradictory. For example, a plural types of fixing members 30 such as the tag pin-like member 32 and the clip 40 may be locked to different positions in one silencer 10. For example, there may also be a case where one wire harness 20 fixed to one silencer 10 includes both the portion where the electrical wire 22 is fixed to the sheet material 24 and the portion where the electrical wires 22 are bundled into the circular shape in cross section.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 1 wire harness fixing structure
10 silencer
12 through hole
20 wire harness
22 electrical wire
23 connector
24 sheet material
26 thread
30 fixing member
32 tag pin-like member
34 first locking part
36 second locking part
38 connection part
40 clip
42 supporting column part
44 locking piece
46 regulating part
48 harness fixing part
50 banding band structure part
52 band part
54 band fixing part
55 insertion hole
56 locking protrusion piece
60 first member
61 shaft
62 flange part
63 retaining part
64 locking protrusion part
65 second member
66 insertion part
67 insertion body part
68 locking protrusion part
70 banding member
80 floor mat
82 body

The invention claimed is:
1. A wire harness fixing structure, comprising:
a silencer disposed between a floor mat and a body in a vehicle;
a wire harness disposed along a main surface of the silencer; and
a fixing member fixing the wire harness to the silencer while being passed through a through hole formed to pass through the silencer in a thickness direction, wherein an inner peripheral surface of the through hole in the silencer is closely attached to the fixing member, and
wherein the fixing member includes a tag pin-like member having a first locking part and a second locking part each locked to an outer side of one of both main surfaces of the silencer and a connection part, at least part of which passes through the silencer, while connecting the first locking part and the second locking part.

2. The wire harness fixing structure according to claim 1, wherein
both one end portion on a side of the first locking part and another end portion on a side of the second locking part in the connection part in the tag pin-like member pass through the silencer in positions away from each other, and the wire harness is sandwiched between the silencer and a middle portion in the connection part which is exposed.

3. The wire harness fixing structure according to claim 1, wherein
the first locking part is located on an outer side of a main surface, on which the wire harness is disposed, of the silencer, and the second locking part is located on an outer side of a main surface located on an opposite side of the main surface, on which the wire harness is disposed, of the silencer, and
a sheet material to which an electrical wire is fixed in the wire harness is located between the first locking part and the silencer.

4. The wire harness fixing structure according to claim 1, wherein
in the main surface located on the opposite side of the main surface, on which the wire harness is disposed, of the silencer, a portion to which at least one of the first locking part and the second locking part in the tag pin-like member is locked is concaved in a thickness direction with respect to a surrounding area of the portion.

5. The wire harness fixing structure according to claim 1, wherein
the wire harness includes an electrical wire and a sheet material which the electrical wire is fixed to and which is sandwiched between the fixing member and the silencer.

6. The wire harness fixing structure according to claim 1, wherein
the wire harness includes a plurality of electrical wires bundled into a circular shape in cross section.

7. A wire harness fixing structure, comprising:
a silencer disposed between a floor mat and a body in a vehicle;
a wire harness disposed along a main surface of the silencer; and
a fixing member fixing the wire harness to the silencer while being passed through a through hole formed to pass through the silencer in a thickness direction, wherein
an inner peripheral surface of the through hole in the silencer is closely attached to the fixing member, wherein
the fixing member includes a clip with a supporting column part and a locking piece formed on a tip of the supporting column part so as to be able to be inserted into and locked to a hole,
the locking piece of the clip is locked to a position of a middle portion in the through hole, and wherein a tip of the locking piece breaks through an inner peripheral surface of the through hole to reach an inner side of the silencer.

8. A wire harness fixing structure, comprising:

a silencer disposed between a floor mat and a body in a vehicle;

a wire harness disposed along a main surface of the silencer; and a fixing member fixing the wire harness to the silencer while being passed through a through hole formed to pass through the silencer in a thickness direction, wherein an inner peripheral surface of the through hole in the silencer is closely attached to the fixing member, and wherein the fixing member includes a first member which is made of a material having higher rigidity than the silencer, sandwiches a peripheral edge part of the through hole, and is fixed to the peripheral edge part and a second member which is inserted into and locked to a bottomed hole formed in the first member.

* * * * *